United States Patent
Golombek et al.

(10) Patent No.: US 11,734,009 B2
(45) Date of Patent: Aug. 22, 2023

(54) PARALLEL PROCESSING OF FETCH BLOCKS OF DATA

(71) Applicant: ARM Limited, Cambridge (GB)

(72) Inventors: Oded Golombek, Even Yehuda (IL); Nimrod Diamant, Kfar Saba (IL)

(73) Assignee: Arm Limited, Cambridge (GB)

( * ) Notice: Subject to any disclaimer, the term of this patent is extended or adjusted under 35 U.S.C. 154(b) by 444 days.

(21) Appl. No.: 15/996,843

(22) Filed: Jun. 4, 2018

(65) Prior Publication Data

US 2019/0034205 A1     Jan. 31, 2019

(30) Foreign Application Priority Data

Jul. 25, 2017    (GB) ...................................... 1711972

(51) Int. Cl.
  *G06F 21/60* (2013.01)
  *G06F 16/23* (2019.01)
  (Continued)

(52) U.S. Cl.
  CPC ........ *G06F 9/3802* (2013.01); *G06F 16/2365* (2019.01); *G06F 21/602* (2013.01);
  (Continued)

(58) Field of Classification Search
  CPC ....... H04L 9/32; H04L 9/3247; H04L 9/3242; H04L 63/0428; H04L 63/12;
  (Continued)

(56) References Cited

U.S. PATENT DOCUMENTS

| | | | | |
|---|---|---|---|---|
| 5,291,612 A | * | 3/1994 | Sosic | ........................ G06F 7/00 |
| | | | | 708/804 |
| 6,021,201 A | * | 2/2000 | Bakhle | .................. H04L 9/3239 |
| | | | | 713/168 |

(Continued)

FOREIGN PATENT DOCUMENTS

| | | | | |
|---|---|---|---|---|
| CA | 2809992 A1 | * | 10/2013 | ............. G06F 21/51 |
| EP | 2 645 291 | | 10/2013 | |

(Continued)

OTHER PUBLICATIONS

Lie et al, Architectural Support for Copy and Tamper Resistant, Yr:2000, ACM, https://pdos.csail.mit.edu/archive/6.824-2005/papers/xom.pdf (Year: 2000).*

(Continued)

*Primary Examiner* — Tae K Kim
(74) *Attorney, Agent, or Firm* — Nixon & Vanderhye P.C.

(57) ABSTRACT

A data processing system comprises fetch circuitry to fetch data as a sequence of blocks of data from a memory. Processing circuitry comprising a plurality of processing pipelines performs at least partially temporally overlapping processing by at least two processes so as to produce respective results for the combined sequence of blocks, i.e. the processing of the data is performed on a block-by-block process at least partially in parallel by the two processing pipelines. The processes performed may comprise a cryptographic hash processing operation performing verification of the data file and a AES MAC process serving to re-signature the data file.

7 Claims, 3 Drawing Sheets

(51) Int. Cl.
*G06F 21/64* (2013.01)
*G06F 21/78* (2013.01)
*G06F 8/65* (2018.01)
*G06F 9/38* (2018.01)

(52) U.S. Cl.
CPC .............. *G06F 21/64* (2013.01); *G06F 21/78* (2013.01); *G06F 8/65* (2013.01)

(58) Field of Classification Search
CPC ........... H04L 2209/38; H04L 2209/125; H04L 9/3236; G06F 21/606; G06F 21/64; G06F 21/60; G06F 21/602; G06F 8/65
See application file for complete search history.

(56) References Cited

U.S. PATENT DOCUMENTS

| | | | | |
|---|---|---|---|---|
| 6,061,449 A * | 5/2000 | Candelore | ........... | G06F 12/1408 380/28 |
| 6,243,361 B1 * | 6/2001 | McMillen | ................. | G01J 3/06 370/254 |
| 6,327,661 B1 * | 12/2001 | Kocher | ................... | H04L 9/003 713/193 |
| 6,704,871 B1 * | 3/2004 | Kaplan | ................... | G06F 21/72 713/192 |
| 6,725,371 B1 * | 4/2004 | Verhoorn, III | ...... | H04L 63/0485 713/176 |
| 7,367,889 B2 * | 5/2008 | Canterbury | ............. | G06F 21/51 463/43 |
| 7,373,504 B1 * | 5/2008 | Belgaied | ................... | H04L 9/00 713/164 |
| 7,401,110 B1 * | 7/2008 | Rarick | ...................... | G06F 7/57 708/700 |
| 7,590,869 B2 * | 9/2009 | Hashimoto | ............. | G06F 21/72 380/228 |
| 7,620,821 B1 * | 11/2009 | Grohoski | .............. | G06F 9/3851 380/1 |
| 7,761,779 B2 * | 7/2010 | Kanai | .................. | G06F 11/1032 711/164 |
| 8,166,294 B1 * | 4/2012 | Sangster | ............... | G06F 21/602 713/164 |
| 8,379,841 B2 * | 2/2013 | Taylor | ................... | H04L 9/0662 380/28 |
| 8,601,000 B1 * | 12/2013 | Stefani | ................. | G06F 16/278 707/747 |
| 8,639,945 B2 * | 1/2014 | Henry | ................. | G06F 12/0875 713/190 |
| 8,650,655 B2 * | 2/2014 | Hayashi | ............... | G06F 21/52 711/5 |
| 8,654,969 B2 * | 2/2014 | Bolotov | ................ | G06F 21/602 380/28 |
| 8,683,208 B2 * | 3/2014 | Hayashi | .............. | G06F 12/1441 713/164 |
| 8,707,062 B2 * | 4/2014 | Jahagirdar | ............ | G06F 1/3203 713/300 |
| 8,782,434 B1 * | 7/2014 | Ghose | .................. | G06F 21/51 713/190 |
| 8,782,435 B1 * | 7/2014 | Ghose | ................... | H04L 9/3247 712/216 |
| 8,898,112 B1 * | 11/2014 | Natanzon | ............ | G06F 11/2074 707/634 |
| 8,904,189 B1 * | 12/2014 | Ghose | ................... | H04L 9/3247 713/190 |
| 8,996,563 B2 * | 3/2015 | Bender | .................... | G06F 9/546 707/769 |
| 9,049,186 B1 * | 6/2015 | Paczkowski | .......... | H04W 12/08 |
| 9,158,924 B2 * | 10/2015 | Maeda | .................. | G06F 21/60 |
| 9,183,606 B1 * | 11/2015 | Paczkowski | ............. | G06T 1/20 |
| 9,489,434 B1 * | 11/2016 | Rath | .................... | G06F 16/2365 |
| 9,501,542 B1 * | 11/2016 | Natanzon | ............ | G06F 3/0689 |
| 9,613,208 B1 * | 4/2017 | Paczkowski | .......... | G06F 21/53 |
| 9,754,100 B1 * | 9/2017 | Hitchcock | ............ | G06F 21/45 |
| 9,767,284 B2 * | 9/2017 | Ghose | ................... | G06F 9/3877 |
| 9,798,898 B2 * | 10/2017 | Henry | ................... | H04L 9/0894 |
| 9,892,283 B2 * | 2/2018 | Henry | ................... | G06F 21/72 |
| 9,911,008 B2 * | 3/2018 | Henry | ................... | G06F 21/72 |
| 9,967,092 B2 * | 5/2018 | Henry | ................... | H04L 9/0825 |
| 10,223,289 B2 * | 3/2019 | Avanzi | ................ | G06F 12/1408 |
| 10,387,402 B2 * | 8/2019 | Stefani | .................. | G06F 16/235 |
| 10,417,190 B1 * | 9/2019 | Donlan | .................. | G06F 3/0643 |
| 2002/0141585 A1 * | 10/2002 | Carr | .................. | H04L 29/06027 380/255 |
| 2002/0165912 A1 * | 11/2002 | Wenocur | ............. | G06Q 10/107 709/203 |
| 2002/0178360 A1 * | 11/2002 | Wenocur | ............. | G06Q 10/107 713/170 |
| 2002/0194483 A1 * | 12/2002 | Wenocur | ............. | G06Q 10/107 713/185 |
| 2002/0194501 A1 * | 12/2002 | Wenocur | ............. | G06Q 10/107 726/4 |
| 2002/0196935 A1 * | 12/2002 | Wenocur | ............. | G06Q 10/107 380/37 |
| 2002/0199001 A1 * | 12/2002 | Wenocur | ............. | G06Q 10/107 709/227 |
| 2002/0199096 A1 * | 12/2002 | Wenocur | ............. | G06Q 10/107 713/153 |
| 2003/0009694 A1 * | 1/2003 | Wenocur | ............. | G06Q 10/107 726/4 |
| 2003/0041110 A1 * | 2/2003 | Wenocur | ............. | G06Q 10/107 709/206 |
| 2003/0194094 A1 * | 10/2003 | Lampson | ............. | G06F 9/4406 380/282 |
| 2003/0229568 A1 * | 12/2003 | Richmann | ............. | G06Q 20/10 705/37 |
| 2004/0008711 A1 * | 1/2004 | Lahti | ....................... | H04L 47/10 370/428 |
| 2004/0015706 A1 * | 1/2004 | Eshghi | .................... | H04L 9/3239 713/189 |
| 2004/0054913 A1 * | 3/2004 | West | ..................... | G06Q 20/341 713/186 |
| 2004/0193763 A1 * | 9/2004 | Iizuka | ..................... | G06F 21/72 710/52 |
| 2004/0205332 A1 * | 10/2004 | Bouchard | ........... | H04L 63/0485 713/153 |
| 2005/0015625 A1 * | 1/2005 | Inoue | ..................... | G06F 21/57 726/4 |
| 2005/0044351 A1 * | 2/2005 | Harvey | ................. | H04L 9/3247 713/153 |
| 2005/0076228 A1 * | 4/2005 | Davis | ..................... | G06F 21/72 713/188 |
| 2006/0107047 A1 * | 5/2006 | Bar-El | ..................... | G06F 21/79 713/168 |
| 2008/0010218 A1 * | 1/2008 | Zank | ...................... | G06F 21/64 705/75 |
| 2008/0077797 A1 * | 3/2008 | Greco | ................... | H04L 9/3247 713/176 |
| 2008/0215920 A1 * | 9/2008 | Mayer | ..................... | G06F 11/28 714/38.1 |
| 2009/0217050 A1 * | 8/2009 | Amiel | ...................... | G06F 21/72 713/176 |
| 2009/0248727 A1 * | 10/2009 | Hughes | ............... | G06F 16/2477 |
| 2010/0098247 A1 * | 4/2010 | Suumaki | ............... | H04L 9/0866 380/44 |
| 2010/0299538 A1 * | 11/2010 | Miller | .................. | G06F 12/1408 713/190 |
| 2011/0026761 A1 * | 2/2011 | Radhakrishnan | .. | G06K 9/00744 382/100 |
| 2011/0044454 A1 * | 2/2011 | Baek | .................... | H04W 12/1006 380/273 |
| 2011/0320803 A1 * | 12/2011 | Hampel | .......... | H04W 12/04071 713/150 |
| 2013/0006993 A1 * | 1/2013 | Kobayashi | .......... | G06F 16/2365 707/737 |
| 2013/0086002 A1 * | 4/2013 | Lyle | .................... | G06F 16/2365 707/690 |
| 2013/0091112 A1 * | 4/2013 | Iyer | ..................... | G06F 16/2365 707/702 |
| 2013/0263255 A1 * | 10/2013 | Wolf | ........................ | G06F 21/64 726/21 |

(56) References Cited

U.S. PATENT DOCUMENTS

| | | | | |
|---|---|---|---|---|
| 2013/0283361 A1* | 10/2013 | Rao | G06F 21/31 | 726/7 |
| 2013/0332744 A1* | 12/2013 | Zhuang | G06F 21/72 | 713/189 |
| 2013/0339968 A1* | 12/2013 | Boland | G06F 9/4881 | 718/103 |
| 2013/0339971 A1* | 12/2013 | Boland | G06F 9/4881 | 718/104 |
| 2014/0006797 A1* | 1/2014 | Cordelia | G06F 12/1408 | 713/189 |
| 2014/0019694 A1* | 1/2014 | Gulley | G06F 5/06 | 711/154 |
| 2014/0059347 A1* | 2/2014 | Dougherty | H04W 12/06 | 713/168 |
| 2014/0082327 A1* | 3/2014 | Ghose | G06F 11/00 | 712/205 |
| 2014/0325239 A1* | 10/2014 | Ghose | H04L 9/3247 | 713/190 |
| 2014/0359306 A1* | 12/2014 | Sasao | G06F 21/52 | 713/189 |
| 2015/0023501 A1* | 1/2015 | Taylor | H04L 9/0618 | 380/44 |
| 2015/0149771 A1* | 5/2015 | Yen | H04L 9/0637 | 713/165 |
| 2015/0149788 A1* | 5/2015 | Gupta | G06F 12/1408 | 713/189 |
| 2015/0169667 A1* | 6/2015 | Roth | G06F 16/2365 | 707/691 |
| 2015/0186139 A1* | 7/2015 | Wolrich | G06F 9/30145 | 712/208 |
| 2015/0363332 A1* | 12/2015 | Mundra | G06F 21/606 | 713/193 |
| 2015/0363333 A1* | 12/2015 | Wallace | G06F 21/85 | 713/193 |
| 2015/0363334 A1* | 12/2015 | Mundra | G06F 12/1408 | 713/193 |
| 2016/0006568 A1* | 1/2016 | Minematsu | H04L 9/3242 | 713/189 |
| 2016/0021093 A1* | 1/2016 | Vinckier | H04L 63/0853 | 726/9 |
| 2016/0063050 A1* | 3/2016 | Schoen | G06F 16/214 | 707/690 |
| 2016/0063281 A1* | 3/2016 | Kahana | G06F 21/71 | 726/27 |
| 2016/0070931 A1* | 3/2016 | Gueron | G06F 9/3016 | 380/28 |
| 2016/0378752 A1* | 12/2016 | Anderson | G06F 16/245 | 707/747 |
| 2016/0380772 A1* | 12/2016 | Gopal | G06F 9/30007 | 713/170 |
| 2017/0004506 A1* | 1/2017 | Steinman | G06Q 20/4014 | |
| 2017/0063566 A1* | 3/2017 | Seminario | H04L 12/2816 | |
| 2017/0180314 A1* | 6/2017 | Walker | G06F 21/00 | |
| 2017/0180341 A1* | 6/2017 | Walker | H04L 63/08 | |
| 2017/0206034 A1* | 7/2017 | Fetik | G06F 3/0653 | |
| 2017/0244729 A1* | 8/2017 | Fahrny | H04L 63/1416 | |
| 2017/0308706 A1* | 10/2017 | Ray | G06F 21/575 | |
| 2017/0353315 A1* | 12/2017 | Dottax | G09C 1/00 | |
| 2018/0032729 A1* | 2/2018 | Zhang | G06F 21/564 | |
| 2018/0034831 A1* | 2/2018 | Zhang | G11C 17/14 | |
| 2018/0197171 A1* | 7/2018 | Steinman | G06Q 20/227 | |
| 2018/0359538 A1* | 12/2018 | Good | H04L 67/2809 | |
| 2019/0125361 A1* | 5/2019 | Shelton, IV | A61B 17/0206 | |
| 2019/0125454 A1* | 5/2019 | Stokes | A61B 34/10 | |
| 2019/0125455 A1* | 5/2019 | Shelton, IV | A61B 5/684 | |
| 2019/0125456 A1* | 5/2019 | Shelton, IV | A61B 34/10 | |
| 2019/0125457 A1* | 5/2019 | Parihar | A61B 34/10 | |
| 2019/0125458 A1* | 5/2019 | Shelton, IV | A61B 34/10 | |
| 2019/0125459 A1* | 5/2019 | Shelton, IV | A61B 34/25 | |
| 2019/0158278 A1* | 5/2019 | Zhuang | H04L 9/0822 | |
| 2019/0171598 A1* | 6/2019 | Zhu | G06F 1/08 | |
| 2019/0200977 A1* | 7/2019 | Shelton, IV | A61B 17/07207 | |
| 2019/0201136 A1* | 7/2019 | Shelton, IV | A61B 90/98 | |
| 2019/0206565 A1* | 7/2019 | Shelton, IV | G16H 40/63 | |
| 2019/0213288 A1* | 7/2019 | Bhowmick | G06F 30/3323 | |
| 2019/0332390 A1* | 10/2019 | Kaminski | G05D 1/0088 | |
| 2019/0332815 A1* | 10/2019 | Kaminski | H04L 9/085 | |
| 2019/0332816 A1* | 10/2019 | Glasco | G06F 21/72 | |
| 2019/0334706 A1* | 10/2019 | Fortenberry | H04L 9/0841 | |
| 2020/0021569 A1* | 1/2020 | Simons | H04L 63/08 | |
| 2020/0034351 A1* | 1/2020 | Matsugatani | G05D 1/0088 | |
| 2020/0043128 A1* | 2/2020 | Kim | G06T 1/60 | |

FOREIGN PATENT DOCUMENTS

| | | | | |
|---|---|---|---|---|
| EP | 2645291 A1 * | 10/2013 | | G06F 21/51 |
| WO | 2009/108776 | 9/2009 | | |
| WO | WO-2009108776 A1 * | 9/2009 | | G06F 7/00 |

OTHER PUBLICATIONS

Chen et al, Certifying Program Execution with Secure Processors, Yr: 2006, MIT, https://pdos.csail.mit.edu/papers/cerium:hotos03.pdf (Year: 2006).*

Suh et al, AEGIS: Architecture for Tamper-Evident and Tamper-Resistant Processing, CSAIL, MIT, http://csg.csail.mit.edu/pubs/memos/Memo-474/Memo-474.pdf (Year: 2004).*

Smith et al, Building a high-performance, programmable secure coprocessor, Yr: 1999, Elsevier, https://www.cs.dartmouth.edu/~sws/pubs/sw99.pdf (Year: 1999).*

Arora et al, Hardware-Assisted Run-Time Monitoring for Secure Program Execution on Embedded Processors, Yr:2006, IEEE Transactions on Very Large Scale Integration (VLSI) (Year: 2006).*

Meixner et al, Argus: Low-Cost, Comprehensive Error Detection in Simple Cores, Yr:2008, IEEE Computer Society, https://ieeexplore.ieee.org/stamp/stamp.jsp?tp=&arnumber=4460512&tag=1 (Year: 2008).*

Tillich et al, Uniform Evaluation of Hardware Implementations of the Round-Two SHA-3 Candidates, Yr: 2010, University of California, Santa Barbara, Candidate Conference, https://burstwiki.org/media/09xxxx-SHABAL_uniform_eval_hw_impl.pdf (Year: 2010).*

Combined Search and Examination Report for GB 1711972.8 dated Jan. 16, 2018, 7 pages.

* cited by examiner ional. One problem that can arise in this type
PARALLEL PROCESSING OF FETCH BLOCKS OF DATA This application is claims priority to GB Patent Application No. 1711972.8 filed Jul. 25, 2017, the entire contents of which are hereby incorporated by reference.

BACKGROUND

Technical Field

This disclosure relates to the field of data processing systems. More particularly, this disclosure relates to processing performed upon data fetched as a sequence of blocks of data.

Technical Background

In some systems, data may be subject to multiple processing operations. For example, data may be fetched from a memory and subject to a first processing operation and then, providing a satisfactory result is achieved from that first processing operation, it may be subject to a second processing operation. One problem that can arise in this type of system is that a malicious person may seek to perturb the operation of the system between completion of the first operation and the starting of the second operation such that the second operation is performed upon modified data or in a modified manner in a way that compromises the security of the system. As an example, a malicious person may subject the system to a clock glitch, a power glitch, a short clock cycle or direct memory content modification between completion of the first process and performing of the second process in a manner such that the data which is processed in a second process, or at least the results of processing that data, do not properly correspond to the data as processed by the first process, or the results of the data processed by the first process.

SUMMARY

At least some example embodiments of the present disclosure provide apparatus for processing data, comprising: fetch circuitry to fetch data as a sequence of blocks of data; and processing circuitry to subject a fetched block of data from among said sequence to at least partially temporally overlapping processing by at least two processes, and, for each of said at least two processes, to generate a result of said processing for said sequence.

At least some example embodiments of the present disclosure provide apparatus for processing data, comprising: fetch means for fetching data as a sequence of blocks of data; and processing means for subjecting a fetched block of data from among said sequence to at least partially temporally overlapping processing by at least two processes, and, for each of said at least two processes, generating a result of said processing for said sequence.

At least some embodiments of the present disclosure provide a method of processing data, comprising: fetching data as a sequence of blocks of data; and subjecting a fetched block of data from among said sequence to at least partially temporally overlapping processing by at least two processes; and for each of said at least two processes, generating a result of said processing for said sequence.

Further aspects, features and advantages of the present technique will be apparent from the following description of examples, which is to be read in conjunction with the accompanying drawings.

DESCRIPTION OF EXAMPLES

Figure 1:
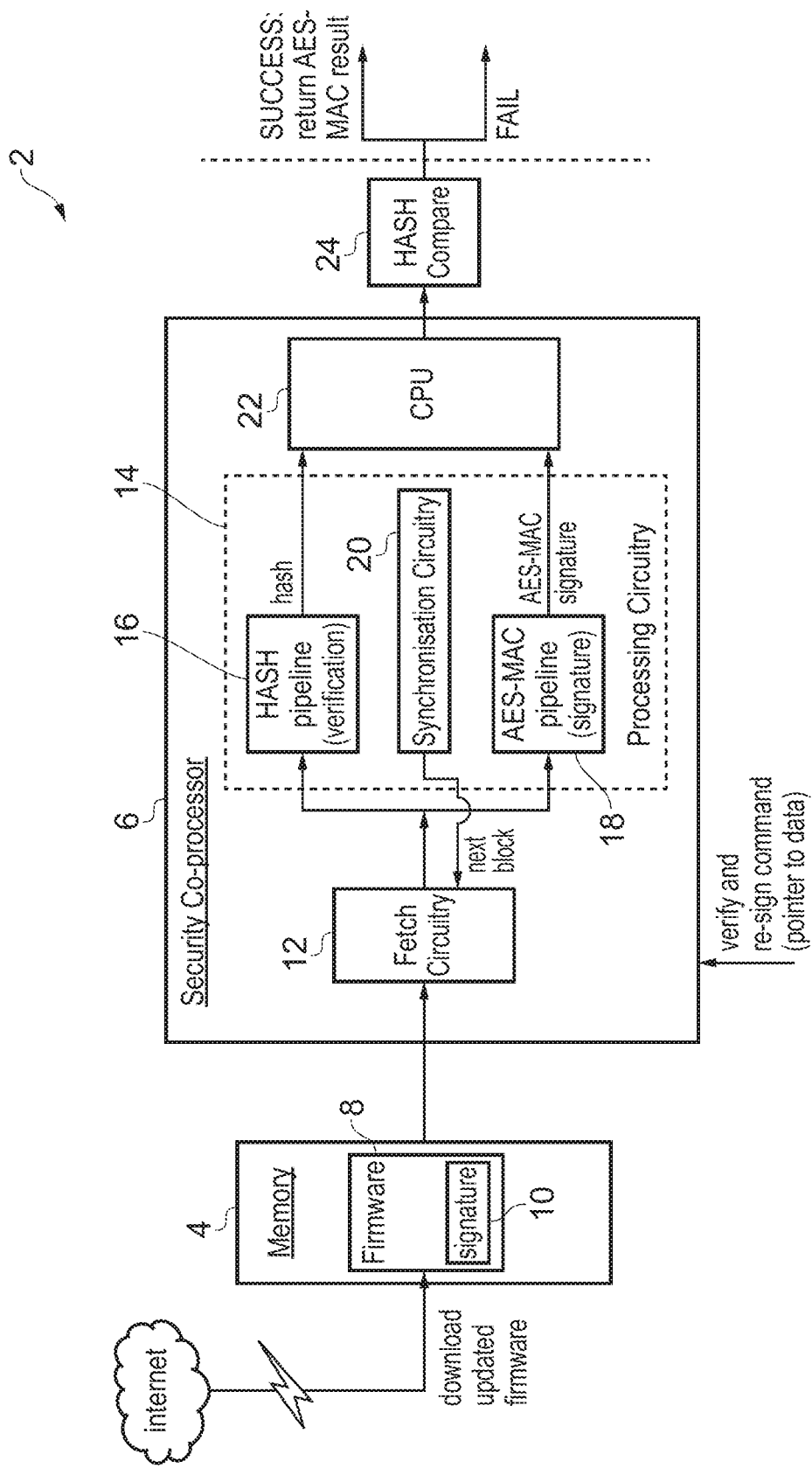
FIG. 1 schematically illustrates a portion of a data processing system which subjects fetched blocks of data to at least partially temporarily overlapping processing by two processors.

FIG. 1 schematically illustrates a portion of a data processing system 2 comprising a memory 4 and a security coprocessor 6 among other components. Data, such as a firmware program file 8 and an associated signature 10, are downloaded to the memory 4 from the internet. The security coprocessor 6 includes fetch circuitry 12 which serves to fetch a sequence of blocks of data corresponding to the data 8 from the memory 4. The data 8 is identified to the security code processor 6 via a signal corresponding to a verify and re-signature command received by the security code processor 6. The verify and re-signature command includes a pointer to the start of the data 8 within the memory 4. The fetch circuitry 12 fetches a first block of data corresponding to a first portion of the data 8 and passes this on to processing pipelines 16, 18 to be subject to a plurality of at least partially temporarily overlapping processes. When this first block of data has been processed, or at least made a predetermined degree of advancement along respective processing pipelines 16, 18, a further block of data is fetched for processing and this is repeated until the entire data 8 has been fetched and subject to processing by the security coprocessor 6.

The security coprocessor 6 comprises processing circuitry 14 which in this example embodiment has the form of a cryptographic hash processing pipeline 16 and a cryptographic message authentication code pipeline 18 (e.g. an AES-MAC processing pipeline). The fetch circuitry 12 passes a fetched block of data in parallel to each of the cryptographic hash processing pipeline 16 and the cryptographic message authentication code pipeline 18 which then perform their respective processing operations. A verification process to generate a result indicative of the integrity of the data 8 is performed by the cryptographic hash processing pipeline 16 and a signature process to generate a new signature value for the data 8 is performed by the cryptographic message authentication code pipeline 18. It will be appreciated that the cryptographic hash result used to confirm the integrity of the data and the signature result resulting from the cryptographic message authentication code signature operation are each results accumulated over the processing of the entire data 8 as this is broken down and processed block-by-block within the processing circuitry 14. The cryptographic hash verification process and the cryptographic message authentication code signature process are merely two examples of cryptographic processes which it may be desired to perform on a block-by-block basis in parallel whilst generating a result for an entire data 8 in order to help increase resistance to an attack upon the integrity of the results being produced. In particular, by performing these processes at least partially temporally overlapping the system gains resistance from taempering such as by introducing clock glitches, power glitches, short clock cycles or directly data modification since if such an attack is used to perturb the data being processed then the perturbed data will be supplied both to the cryptographic hash processing pipeline 16 and the cryptographic message authentication code pipeline 18 and accordingly the cryptographic hash verification process will fail even though the cryptographic message authentication code process produces a signature value. More particularly, breaking the processing of the data file down into blocks and processing these blocks in parallel prevents a malicious person introducing a glitch to the system between the verification process having successfully completed and the signature process being performed in a manner which could otherwise result in a signed version of a modified data file being generated on the basis of the trust achieved by checking the cryptographic hash value of that data file before it was modified.

FIG. 1 illustrates synchronization circuitry 20 disposed between the cryptographic hash processing pipeline 16 and the cryptographic message authentication code pipeline 18. The respective processing operations performed in at least a partially parallel fashion may operate at different rates and so the processing for one of the processes for a given block of data may complete before the processing by the other process. For example, the verification performed by the cryptographic hash may be slower than the cryptographic message authentication code signature generation. The synchronization circuitry 20 serves to synchronize the operation of the two processing pipelines 16, 18 so as to pause advancement to process a next fetch block of data by a processing pipeline which finishes first while the other of the processing pipelines continues to process that fetch block of data and finishes that processing. Thus, the two processing pipelines 16, 18 proceed in lock step to process at least partially in parallel blocks of data which are fetched from the data 8.

As previously mentioned, the cryptographic hash process performs a verification of the integrity of the data 8 and when all of the blocks of data into which the data 8 has been broken down have been processed, a final cryptographic hash value for the data 8 will be generated. In parallel with this, and on a block-by-block basis, the cryptographic message authentication code pipeline 18 generates a signature for the data 8 to be used in place of the cryptographic hash based signature upon subsequent manipulation of that verified data file within the data processing system 2. Such a verification and re-signature process may be undertaken as checking the new signature can subsequently be performed more rapidly than the cryptographic hash process so resulting in faster operation of the data processing system 2 when it wishes to re-verify the integrity of the data 8. When the data 8 has been subject to processing of all its blocks of data, then the cryptographic hash value generated and the new cryptographic message authentication code signature are passed to a general purpose processor 22 which serves to perform a cryptographic hash compare operation signified by processing block 24 in which the cryptographic hash value generated in the cryptographic hash processing pipeline 16 is compared with the signature 10 obtained from the memory 4. If the cryptographic hash value calculated matches the signature 10, then the verification and re-signature process has been a success and the output of the security coprocessor 6 is a combined result indicating a successful result and the associated new cryptographic message authentication code signature value. If the cryptographic hash value calculated by the cryptographic hash processing pipeline 16 does not match the signature 10, then the combined result of the cryptographic hash processing and the cryptographic message authentication code re-signature processing is a fail result.

Figure 2:
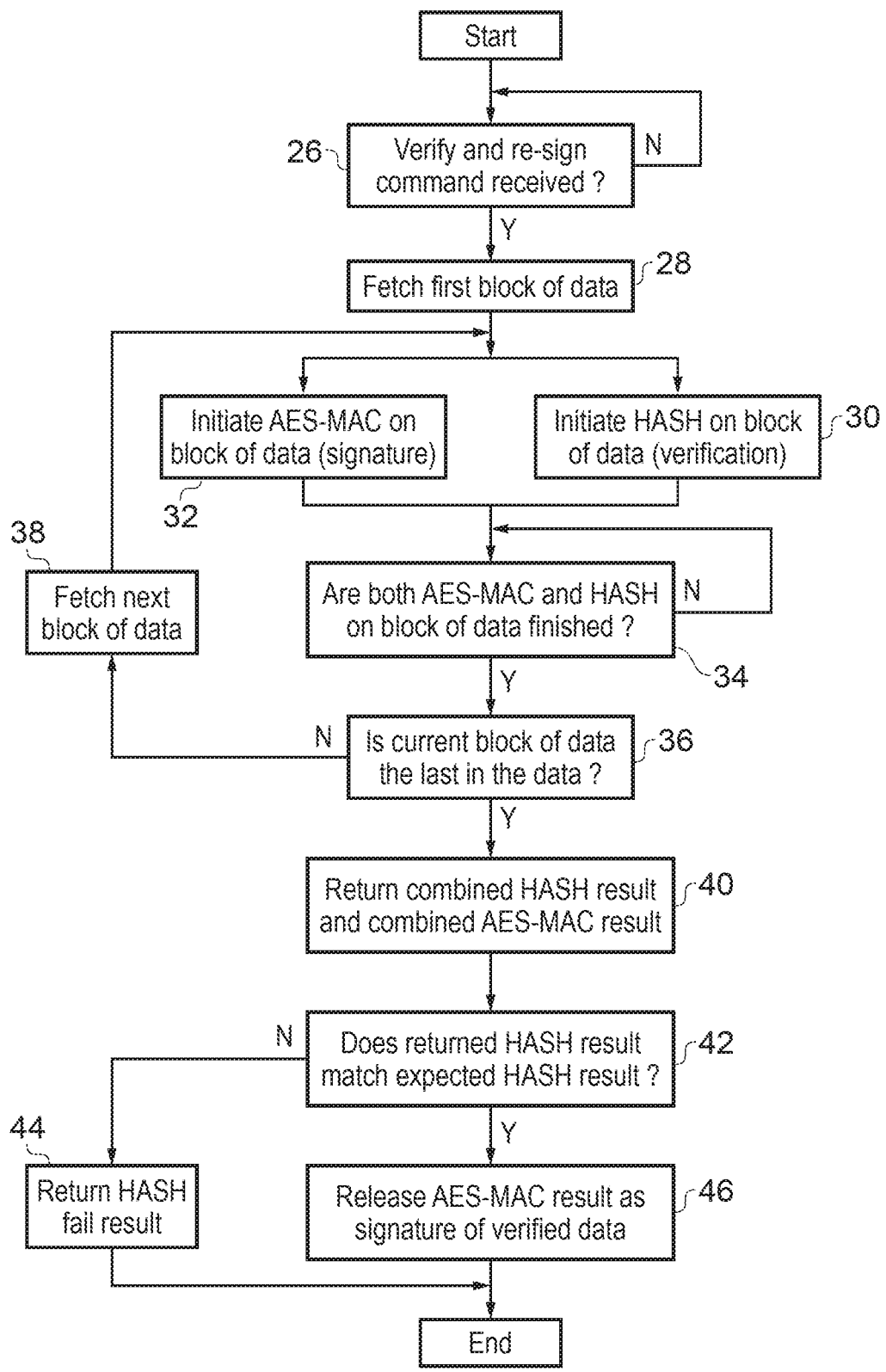
FIG. 2 is a flow diagram schematically illustrating the operation of the system of FIG. 1.

FIG. 2 is a flow diagram schematically illustrating the operation of the system illustrated in the FIG. 1. At step 26 processing waits until a verify and re-signature command is received by the security coprocessor 6. When such a command is received, then step 28 serves to fetch a first block of data as pointed to by the pointer value received as part of the verify and re-signature command and corresponding to the start of the data 8. When this first block of data has been fetched, it is passed to both the cryptographic hash processing pipeline 16 and the cryptographic message authentication code pipeline 18 in parallel and these respectively initiate a cryptographic hash operation upon that block of data at step 30 and an cryptographic message authentication code operation on that same block of data at step 32. Processing then waits at step 34 until both the cryptographic message authentication code and the cryptographic hash operation on the block of data being processed in steps 30 and 32 have completed. Step 34 corresponds to the action of the synchronization circuit 20 illustrated in FIG. 1. When both the cryptographic message authentication code and the cryptographic hash processing have completed for the given block of data, processing proceeds to step 36 where a determination is made as to whether or not the currently processed block of data is the last block of data in the data 8. If the determination is that the block of data is not the last block of data in the data 8, then step 38 serves to fetch the next block of data to be processed and this is passed in parallel to the cryptographic hash processing pipeline 16 and the cryptographic message authentication code pipeline 18 corresponding to steps 30 and 32 respectively.

If the determination at step 36 is that the last block of data has already been fetched, then processing proceeds to step 40 where the combined cryptographic hash result for the full data 8 and the re-signature value for the full data 8 are returned by the processing circuitry 14. Step 42 determines whether the returned cryptographic hash result matches the expected cryptographic hash result (signature 10). If a match is not detected at step 42, then step 44 serves to return a cryptographic hash fail result indicating that the data 8 did not pass its verification. If the result of step 42 was a match, then processing proceeds to step 46 at which the cryptographic message authentication code result which was generated in the cryptographic message authentication code pipeline 18 is indicated as being a valid new signature value for data 8 which has successfully passed verification of its integrity using the cryptographic hash result produced by the cryptographic hash processing pipeline 16 and the signature 10 associated with the data 8.

Figure 3:
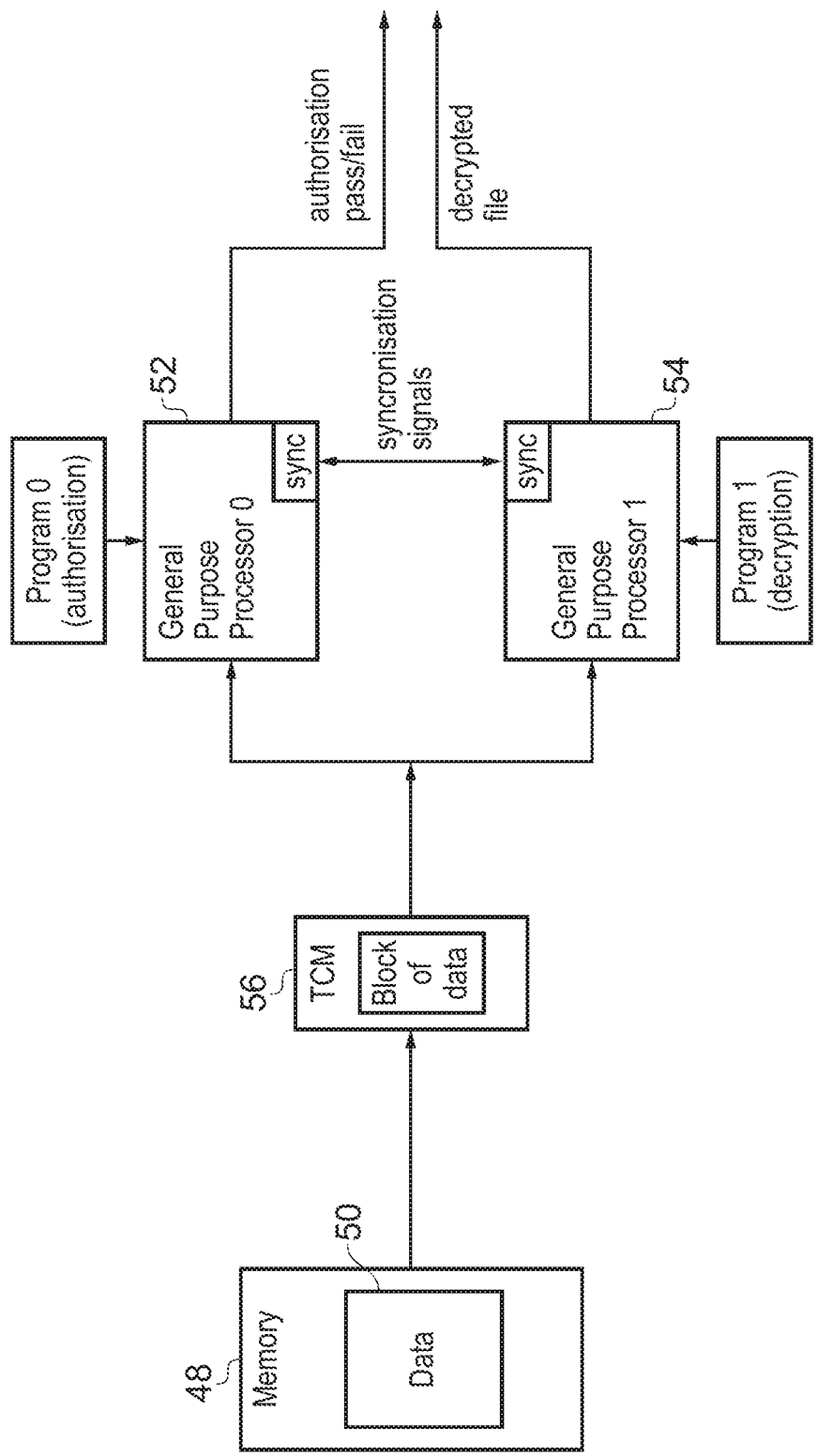
FIG. 3 is a diagram schematically illustrating a further example embodiment in which two general purpose processors perform partially temporarily overlapping processing upon a sequence of fetched blocks of data.

FIG. 3 schematically illustrates a further example embodiment of the present techniques. A memory 48 stores data 50 which is fetched under control of fetch circuitry (not illustrated) associated with at least one of a first general purpose processor 52 and a second general purpose processor 54. A block of fetched data from the data 50 is stored into a tightly coupled memory 56 associated with the general purpose processors 52, 54. Each of the general purpose processors 52, 54 then executes its own processing operation under control of its own sequence of program instructions to perform a respective processing operation upon the block of data within the tightly coupled memory 56. These processing operations could take a variety of different forms such as, for example, an authorization processing operation and a decryption processing operation. In such an example, if the authorization is indicated as valid when the entire data 50 has been processed on a block-by-block basis, then the decrypted version of that data which was generated in parallel on a block-by-block basis will be an authorized decrypted file generated as part of a combined result.

In order to keep the two general purpose processors 52, 54 in synchronism in their processing of the data 50 on a block-by-block basis at least one of the streams of program instructions executed by a respective general purpose processor 52, 54 (the quicker to complete) includes a synchronization instruction which serves to pause advancement to process a next fetched block of data by that general purpose processor while the other of the general purpose processors continues to process the currently fetched block of data and completes that processing. Thus, even though the general purpose processors 52, 54 may complete at different times, they are constrained to advance to process a next block of data in lock step.

The present techniques may be used in a variety of different situations in which it is desired to perform two processing operations upon the same data and reduce the likelihood of an unauthorized person being able to inappropriate alter the data, or its processing, to generate erroneous operation, such as by altering the data between completion of the first data processing and starting of the second data processing. An example of a situation in which such a problem may arise is when data is downloaded to a data processing apparatus for subsequent storage and use by that data processing apparatus. In this situation it is desirable that the downloaded data file should be verified to ensure it is unaltered since it was originally signed (a previous verification) and then to generate a new signature value which can subsequently be used by the apparatus itself to more rapidly determine that that data is unaltered whilst it is stored within the apparatus between uses. The downloaded data may, for example, comprise a software program to be executed by the apparatus such as a firmware program. Such software program may need to be downloaded as part of a software update process to be performed. It will be appreciated that the present technique may be used in situations other than such a firmware verification and re-signature process.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus comprising:
fetch circuitry configured to fetch a sequence of encrypted blocks of an updated firmware data file, the updated firmware data file and an associated asymmetric signature having been downloaded over a non-secure data network; and processing circuitry coupled to the fetch circuitry and including a cryptographic hash processing pipeline and a cryptographic message authentication code pipeline, the processing circuitry being configured to subject, in response to program instructions that are separate from the sequence of encrypted blocks of the updated firmware data file, the fetched sequence of encrypted blocks of the updated firmware data file to at least partially temporally overlapping processing by the cryptographic hash processing pipeline and the cryptographic message authentication code pipeline, and, for each of the cryptographic hash processing pipeline and the cryptographic message authentication code pipeline, to generate an accumulated cryptographic result of the partially temporally overlapping processing for the sequence of encrypted blocks of the updated firmware data file;

wherein the cryptographic hash processing pipeline is configured to generate decrypted data from the sequence of encrypted blocks of the updated firmware data file and to generate a cryptographic hash result to confirm the integrity of the update firmware data file, the cryptographic hash result being accumulated over block-by-block processing of the encrypted blocks the updated firmware data file;

wherein the cryptographic message authentication code pipeline is configured to use symmetric cryptography processing to process the encrypted blocks of the updated firmware data file on a block-by-block basis to generate a new signature result for the updated firmware data file to be used, in place of the associated asymmetric signature, to verify that the decrypted data is untampered since a previous verification;

wherein the processing circuitry is configured to generate a combined result from the respective accumulated cryptographic results of the cryptographic hash processing pipeline and the cryptographic message authentication code pipeline; and wherein the updated firmware data file is blocked from the subsequent storage in memory and use by the apparatus in response to the processing circuitry comparing the accumulated cryptographic result and the new signature result to verify the updated firmware data file and failing to verify that the updated firmware data file is unaltered since the previous verification.

2. Apparatus as claimed in claim 1, wherein the processing circuitry comprises synchronization circuitry to pause advancement to process a next fetched encrypted block of the updated firmware data file by at least one of the cryptographic hash processing pipeline and the cryptographic message authentication code pipeline that completes processing of the fetched encrypted block while another of the cryptographic hash processing pipeline and the cryptographic message authentication code pipeline continues to process the fetched encrypted block.

3. Apparatus as claimed in claim 1, wherein the processing circuitry comprises at least two general purpose processors executing respective streams of program instructions to subject the fetched sequence of encrypted blocks to parallel processing to by the cryptographic hash processing pipeline and the cryptographic message authentication code pipeline.

4. Apparatus as claimed in claim 3, wherein at least one of the respective streams of program instructions comprises a synchronization instruction to pause advancement to process a next fetched encrypted block of the updated firmware data file by at least one of the at least two general purpose processors that completes processing of the next fetched encrypted block of the updated firmware data file while another of the at least two general purpose processors continues to process the next fetched encrypted block of the updated firmware data file.

5. Apparatus as claimed in claim 1, wherein use of the new signature result to determine the updated firmware data file is unaltered reduces the amount of time to verify that the updated firmware data file is unaltered.

6. Apparatus as claimed in claim 1, wherein processing by the cryptographic hash processing pipeline and the cryptographic message authentication code pipeline is initiated by receipt by the apparatus of a pointer to a start position of a memory address region within the memory, and the associated asymmetric signature.

7. A method comprising:
fetching a sequence of blocks of encrypted blocks of an updated firmware data file, the updated firmware data file and an associated asymmetric signature having been downloaded over a non-secure data network; and
in response to program instructions that are separate from the sequence of blocks of data, subjecting the fetched sequence of blocks of data to at least partially temporally overlapping processing by a cryptographic hash processing pipeline and a cryptographic message authentication code pipeline; and
in response to program instructions that are separate from the sequence of encrypted blocks of the updated firmware data file, subjecting the fetched sequence of encrypted blocks of the updated firmware data file to at least partially temporally overlapping processing by the cryptographic hash processing pipeline and the cryptographic message authentication code pipeline, and for each of the cryptographic hash processing pipeline and the cryptographic message authentication code pipeline, to generate an accumulated cryptographic result of the partially temporally overlapping processing for the sequence of encrypted blocks of the updated firmware data file;
the cryptographic hash processing pipeline generating decrypted data from the sequence of encrypted blocks of the updated firmware data file and generating a cryptographic hash result to confirm the integrity of the update firmware data file, the cryptographic hash result being accumulated over block-by-block processing of the encrypted blocks the updated firmware data file;
the cryptographic message authentication code pipeline using symmetric cryptography processing to process the encrypted blocks of the updated firmware data file on a block-by-block basis and generating a new signature result for the updated firmware data file to be used, in place of the associated asymmetric signature, to verify that the decrypted data is untampered since a previous verification;
generating a combined result from the respective accumulated cryptographic results of the cryptographic hash processing pipeline and the cryptographic message authentication code pipeline; and
blocking the updated firmware data file from the subsequent storage in and use by the apparatus in response to the processing circuitry comparing the accumulated cryptographic result and the new signature result to verify the updated firmware data file and failing to verify that the updated firmware data file is unaltered since the previous verification.

* * * * *